United States Patent
Seo

(10) Patent No.: US 9,648,221 B2
(45) Date of Patent: May 9, 2017

(54) AUTOFOCUS SYSTEM USING PHASE DIFFERENCE DATA FOR ELECTRONIC DEVICE AND ELECTRONIC DEVICE USING THE SAME

(71) Applicant: SAMSUNG ELECTRONICS CO., LTD., Suwon-si, Gyeonggi-do (KR)

(72) Inventor: Seong Hun Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 274 days.

(21) Appl. No.: 14/244,036

(22) Filed: Apr. 3, 2014

(65) Prior Publication Data

US 2014/0300749 A1 Oct. 9, 2014

(30) Foreign Application Priority Data

Apr. 3, 2013 (KR) .................. 10-2013-0036191

(51) Int. Cl.
*H04N 5/232* (2006.01)
*G02B 7/36* (2006.01)
*G02B 5/20* (2006.01)

(52) U.S. Cl.
CPC ........... *H04N 5/23212* (2013.01); *G02B 7/36* (2013.01); *G02B 5/208* (2013.01)

(58) Field of Classification Search
CPC ....... H04N 5/23212; G02B 7/36; G02B 5/208
See application file for complete search history.

(56) References Cited

U.S. PATENT DOCUMENTS

| 5,500,708 | A | * | 3/1996 | Ohsawa | G02B 7/28 250/201.1 |
|---|---|---|---|---|---|
| 5,745,177 | A | * | 4/1998 | Lamoure | G02B 27/02 348/373 |
| 6,304,293 | B1 | * | 10/2001 | Kubota | H04N 9/045 348/229.1 |
| 6,975,358 | B1 | * | 12/2005 | Morley | H04N 5/2259 348/335 |
| 2002/0014577 | A1 | * | 2/2002 | Ulrich | G01B 11/2513 250/205 |

(Continued)

FOREIGN PATENT DOCUMENTS

KR 10-2009-0087694 A 8/2009

*Primary Examiner* — Jay Patel
*Assistant Examiner* — Joseph Suh
(74) *Attorney, Agent, or Firm* — Drinker Biddle & Reath LLP

(57) ABSTRACT

An electronic device including an image sensor, a phase difference autofocus (AF) sensor module, a reflection-type infrared (IR) cut-off filter, and an absorption-type IR cut-off filter, wherein the reflection-type IR cut-off filter is disposed on an optical axis to reflect a first portion of light incident thereon through an imaging lens to the phase difference AF sensor module and to allow a second portion of the light to be transmitted therethrough, the absorption-type IR cut-off filter is disposed between the image sensor and the reflection-type IR cut-off filter on the optical axis to filter the second portion of the light transmitted through the reflection-type IR cut-off filter, and the phase difference AF sensor module performs auto-focusing on a subject using the first portion of the light reflected from the reflection-type IR cut-off filter.

8 Claims, 5 Drawing Sheets

(56) References Cited

U.S. PATENT DOCUMENTS

| | | | | |
|---|---|---|---|---|
| 2002/0025156 A1* | 2/2002 | Kuwata | ............ | G03B 13/00 |
| | | | | 396/114 |
| 2003/0231291 A1* | 12/2003 | Kitajima | ............ | G02B 7/08 |
| | | | | 355/56 |
| 2007/0019099 A1* | 1/2007 | Lieberman | ............ | G02B 13/16 |
| | | | | 348/335 |
| 2009/0168154 A1* | 7/2009 | Irie | ............ | G03B 17/02 |
| | | | | 359/359 |
| 2010/0006747 A1* | 1/2010 | Wu | ............ | G02B 13/00 |
| | | | | 250/216 |
| 2011/0211073 A1* | 9/2011 | Foster | ............ | H04N 5/232 |
| | | | | 348/164 |
| 2013/0190965 A1* | 7/2013 | Einecke | ............ | A01D 34/008 |
| | | | | 701/28 |

\* cited by examiner

AUTOFOCUS SYSTEM USING PHASE DIFFERENCE DATA FOR ELECTRONIC DEVICE AND ELECTRONIC DEVICE USING THE SAME

CROSS-REFERENCE TO RELATED APPLICATION(S)

This application claims the priority benefit under 35 U.S.C. §119(a) from Korean Patent Application No. 10-2013-0036191, filed on Apr. 3, 2013 in the Korean Intellectual Property Office, the disclosure of which is incorporated herein by reference in its entirety.

BACKGROUND

1. Field

Embodiments of the present disclosure relate to an autofocus system for electronic devices and an electronic device using the same.

2. Description of the Related Art

With the development of photography and increased user interest therein, various kinds of cameras such as a Digital Single Lens Reflex (DSLR) camera, a Digital Single Lens Translucent (DSLT) camera, and a compact camera have recently been commercialized.

The DSLR camera causes incident light transmitted through a lens to reflect from a mirror to allow a user to see an object. When the shutter button is pressed, the mirror is lifted up, and light directly reaches an image sensor such that an image is captured, while the shutter is open.

The DSLT camera captures a still image or a moving image by adjusting the transmissivity of a reflection mirror, not lifting the mirror. The DSLT camera allows capturing an image without a mirror box by adjusting the transmissivity of a translucent mirror, which is distinguished from the half mirror of the DSLR camera. In capturing images, the DSLT camera does not necessitate lifting of the mirror to expose the image sensor to light.

In the case of the compact camera, light traveling through the lens directly reaches the image sensor without assistance of a mirror. When light is incident on the image sensor, an electrical signal is transferred to a liquid crystal display (LCD), thereby allowing a user to check an image to be captured through the LCD.

In addition to the above types of cameras, development of camera devices capable of capturing a high-quality image is still under way.

SUMMARY

Various embodiments provide an autofocus (AF) system, for electronic devices, which has a good continuous shooting speed and allows operation of a phase difference AF in a live view mode, and an electronic device using the same.

Additional embodiments will be set forth in part in the description which follows and, in part, will be apparent from the description, or may be learned by practice of the embodiments.

According to an embodiment, an electronic device includes an image sensor, a phase difference autofocus (AF) sensor module, a reflection-type infrared (IR) cut-off filter disposed on an optical axis to reflect a first portion of light incident thereon through an imaging lens to the phase difference AF sensor module and to allow a second portion of the light to be transmitted therethrough, and an absorption-type IR cut-off filter disposed between the image sensor and the reflection-type IR cut-off filter on the optical axis to filter the second portion of the light transmitted through the reflection-type IR cut-off filter. The phase difference AF sensor module performs auto-focusing on a subject using the first portion of the light reflected from the reflection-type IR cut-off filter.

The reflection-type IR cut-off filter may be disposed to have an inclination angle that allows the first portion of the light to be reflected to the phase difference AF sensor module.

The absorption-type IR cut-off filter may filter an infrared wavelength band of light of the second portion of the light that has not been filtered by the reflection-type IR cut-off filter due to the inclination angle of the reflection-type IR cut-off filter.

The absorption-type IR cut-off filter may be disposed between the image sensor and the reflection-type IR cut-off filter to face the image sensor and to be parallel with the image sensor.

The electronic device may further include an auxiliary infrared light source to emit auxiliary infrared light.

According to another embodiment, an autofocus system for an electronic device includes a phase difference autofocus (AF) sensor module, a controller, a reflection-type IR cut-off filter, and an absorption-type IR cut-off filter. The controller is connected to the phase difference AF sensor module. The reflection-type infrared (IR) cut-off filter is disposed on an optical axis to reflect a first portion of light incident thereon through an imaging lens to the phase difference AF sensor module and to allow a second portion of the light to be transmitted therethrough. The absorption-type IR cut-off filter is disposed on the optical axis to filter the second portion of the light transmitted through the reflection-type IR cut-off filter. The phase difference AF sensor module receives the first portion of light reflected from the reflection-type IR cut-off filter. The controller performs auto-focusing on a subject using the first portion of light reflected from the reflection-type IR cut-off filter.

The reflection-type IR cut-off filter may be disposed to have an inclination angle that allows the first portion of the light to be reflected to the phase difference AF sensor module.

The absorption-type IR cut-off filter may filter an infrared wavelength band of light of the second portion of the light that has not been filtered by the reflection-type IR cut-off filter due to the inclination angle of the reflection-type IR cut-off filter.

The first portion of the light may include light with a wavelength in an infrared wavelength band and the second portion of the light may include light with a wavelength outside of the infrared wavelength band.

When a third portion of the light in the infrared wavelength band is transmitted through the reflection-type IR cut-off filter, the absorption-type IR cut-off filter may filter the third portion of the light in the infrared wavelength band transmitted through the reflection-type IR cut-off filter.

The autofocus system may further include an image capture unit to convert the light transmitted through the absorption-type IR cut-off filter into an electrical signal.

The image capture unit may be an image sensor. The absorption-type IR cut-off filter may be disposed between the image sensor and the reflection-type IR cut-off filter to face the image sensor and to be parallel with the image sensor.

The controller may control movement of the imaging lens based on a focal length detected based on a result of performing the auto-focusing.

The autofocus system may further include an auxiliary infrared light source to emit auxiliary infrared light.

If a quantity of the first portion of light received by the phase difference AF sensor module is equal to or less than a reference value, the controller may control the auxiliary infrared light source to emit the auxiliary infrared light.

BRIEF DESCRIPTION OF THE DRAWINGS

These and/or other features of the disclosure will become apparent and more readily appreciated from the following description of the embodiments, taken in conjunction with the accompanying drawings of which.

DETAILED DESCRIPTION

Figure 1:
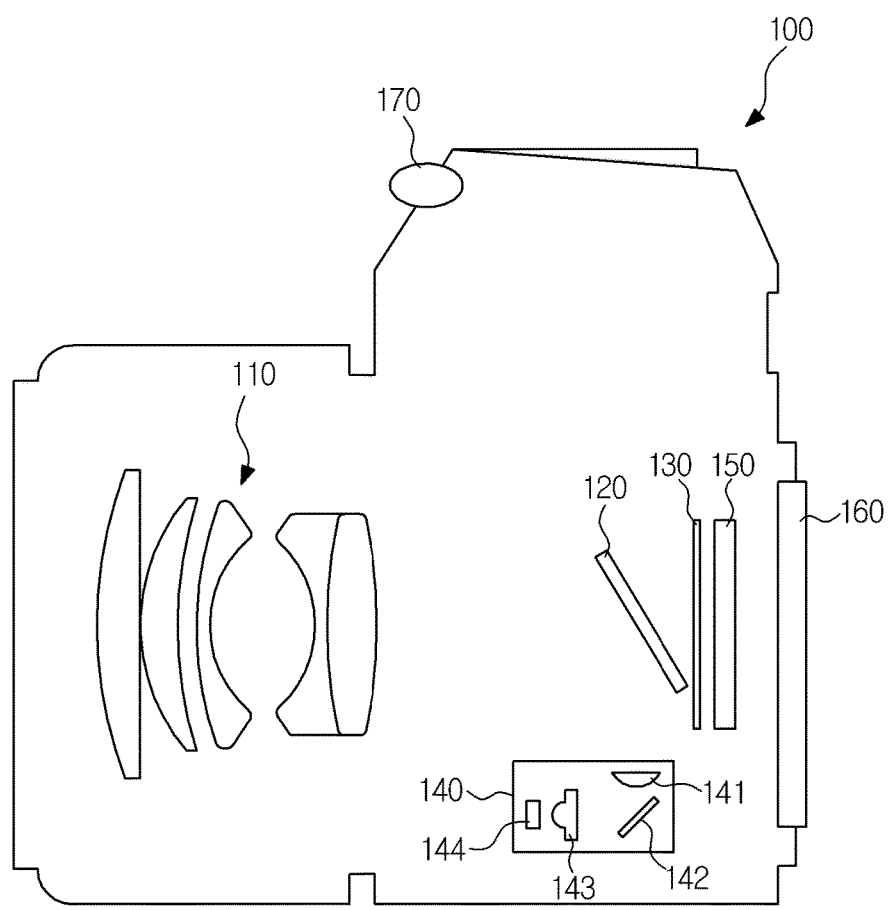
FIG. 1 is a schematic diagram showing a structure of an electronic device according to an embodiment.

Reference will now be made in detail to various embodiments, examples of which are illustrated in the accompanying drawings, wherein like reference numerals refer to like elements throughout. In describing the embodiments, a detailed description of well-known technologies is omitted where such description could unnecessarily obscure other points of the embodiments. In this specification, terms such as "first" and "second" are intended to distinguish one constituent from another, and not to limit the constituents.

Hereinafter, a description will be given of various embodiments with reference to the drawings.

Figure 2:
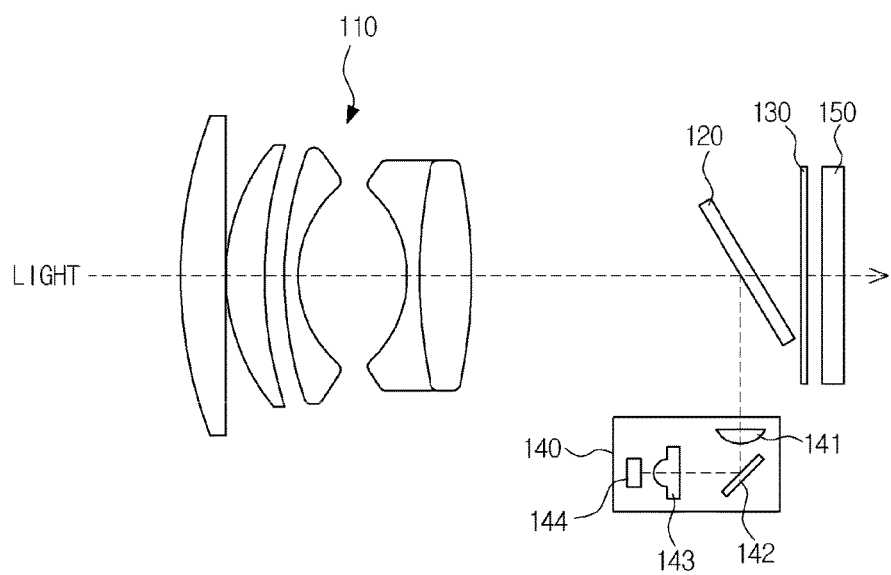
FIG. 2 is a schematic diagram illustrating a path of light in the electronic device of FIG. 1.

FIG. 1 is a schematic diagram showing the structure of an electronic device 100 according to an embodiment, and FIG. 2 is a schematic diagram illustrating the path of light in the electronic device 100 of FIG. 1.

As shown in FIG. 1, the electronic device 100, such as a camera, may include an imaging lens 110, a reflection-type infrared (IR) cut-off filter 120, a absorption-type IR cut-off filter 130, a phase difference autofocus (AF) sensor module 140, an image sensor 150, a liquid crystal display (LCD) 160, and an auxiliary IR light source 170.

More specifically, the reflection-type IR cut-off filter 120 is disposed on an optical axis to reflect a first portion of the light transmitted through the imaging lens 110 to the phase difference AF sensor module 140 and to allow a second portion (e.g., a remainder portion) of the light to be transmitted therethrough. For example, the reflection-type IR cut-off filter 120 reflects incident light in an infrared wavelength band towards the phase difference AF sensor module 140, and allows incident light outside of the infrared wavelength band to be transmitted through towards the absorption-type IR cut-off filter 130. The light outside of the infrared wavelength band may refer to light outside of a long-wavelength band (for example, infrared light), such as visible light or light in a short-wavelength band.

Herein, the first portion of the light reflected by the reflection-type IR cut-off filter 120 (e.g., in the infrared wavelength band) and incident on the phase difference AF sensor module 140 may be utilized for phase difference AF data, and the light transmitted through the reflection-type IR cut-off filter 120 to the image sensor 150 via the absorption-type IR cut-off filter 130 may be utilized for an image signal.

As described above, light is allowed, by the reflection-type IR cut-off filter 120, to be incident on both the phase difference AF sensor module 140 and the image sensor 150. Therefore, the phase difference AF sensor is operable even in a live view mode, thus enabling auto-focusing in many situations and providing a more stabilized image. Moreover, as the reflection-type IR cut-off filter 120 is applied to the electronic device 100, the electronic device 100 may have little loss of visible light, thereby maintaining high image quality. In addition, light in an infrared wavelength band, from an infrared light source (e.g., auxiliary IR light source 170) applied to the electronic device 100, may be utilized by the phase difference AF sensor module 140, and is blocked from being incident on the image sensor 150. Therefore, existing color reproduction may be preserved.

As shown in FIG. 2, the reflection-type IR cut-off filter 120 may be disposed to have an inclination angle to allow incident light in the infrared wavelength band to be reflected to the phase difference AF sensor module 140. While the phase difference AF sensor module 140 is illustrated in FIG. 2 as being disposed at a lower inner portion of the electronic device 100, embodiments of the invention are not limited thereto. The phase difference AF sensor module 140 may be positioned at any place in the electronic device 100 as desired by a designer or manufacturer of the electronic device 100. Herein, the reflection-type IR cut-off filter 120 may have any inclination angle provided that the reflection-type IR cut-off filter 120 reflects a first portion of the incident light in the infrared wavelength band to the phase difference AF sensor module 140 and allows a second portion of the incident light to be transmitted therethrough.

The absorption-type IR cut-off filter 130 may be disposed between the image sensor 150 and the reflection-type IR cut-off filter 120 on the optical axis to filter light transmitted through the reflection-type IR cut-off filter 120. As shown in FIG. 2, the absorption-type IR cut-off filter 130 may be disposed between the image sensor 150 and the reflection-type IR cut-off filter 120 to face the image sensor 150 and to be parallel with the image sensor 150.

In addition, the absorption-type IR cut-off filter 130 may provide additional filtering of the wavelength band of light to be filtered. For example, the absorption-type IR cut-off filter 130 filters a third portion of light in the infrared wavelength band that has not been filtered (i.e., reflected) by the reflection-type IR cut-off filter 120 (e.g., due to the inclination angle of the reflection type IR cut-off filter 120). In one example, to promote more accurate filtering, the absorption-type IR cut-off filter 130 may provide additional filtering of the wavelength band of light to be filtered based on light in the infrared wavelength band which is not filtered by the reflection-type IR cut-off filter 120 due to the inclination angle.

The phase difference AF sensor module 140 may perform auto-focusing of a subject using incident light reflected from the reflection-type IR cut-off filter 120. The phase difference AF sensor module 140 may adjust focus by dividing the incident light and comparing waveforms of an image. In adjusting the focus in this manner, a lens in the phase difference AF sensor module 140 is used to form two or more images based on image information of a subject transmitted through the lens. Then, the distance between the images is measured using a line sensor to estimate the space between respective focuses of the two images. When the focuses overlap, one image is accurately formed on the image-forming surface, and an image interval frequency may coincide with two output signals of two photoelectric devices within the phase difference AF sensor module 140. In the case that the imaging lens 110 is focused too near, i.e., the focal point is formed before the image-forming surface, an interval between profiles of the two output signals is narrower than in the case that the subject is focused on the image-forming surface. On the other hand, in the case that the imaging lens 110 is focused too far, i.e., the focal point is formed at a position beyond the image-forming surface, the interval between the profiles of the two output signals is wider than the proper interval. After the two output signals are measured, the phase difference AF sensor determines in which direction and how much to move the imaging lens 110 and then moves the imaging lens 110.

The phase difference AF sensor module 140 may include a first lens 141, a reflection mirror 142, a second lens 143, and a phase difference AF sensor 144. As shown in FIG. 2, the first lens 141 may serve to collect incident light transmitted to the phase difference AF sensor module 140. The reflection mirror 142 may reflect the incident light transmitted through the first lens 141 toward the phase difference AF sensor 144. The reflection mirror 142 may be disposed to change the path of light to utilize space of a body of the electronic device 100. The second lens 143 may form an image on the phase difference AF sensor 144. The phase difference AF sensor 144 may be configured with a plurality of photoelectric devices (e.g., two photoelectric devices) disposed in specific areas. Thereby, the phase difference AF sensor 144 may detect whether the image of a subject is focused by comparing outputs of the photoelectric devices.

The image sensor 150 may convert incident light transmitted through the imaging lens 110 into an electrical signal. Herein, the types of the image sensor 150 may be a charge coupled device (CCD) or a complementary metal oxide semiconductor (CMOS) device. However, embodiments of the invention are not limited thereto. The CCD, which is a recording device which uses accumulation and transmission of electric charges, sensitively responds even to weak light, thereby providing a high-quality image. Since the CCD has a generally simple structure, it may be integrated with high density. Further, the CCD may be a volatile device of lower power consumption. In addition, the CCD has a generally simple structure formed by forming a thin oxide film on a silicon substrate and arranging a plurality of electrodes on the film. Meanwhile, a CMOS device is generally an imaging device of low power consumption. The CMOS device may consume one tenth the power consumed by the CCD and use a 3.3 V single-phase electric power. The CMOS device may be integrated with surrounding circuits.

The LCD 160 receives a signal of an image transmitted thereto and displays the image on a screen. In addition, the LCD 160 may display information associated with the electronic device 100 such as a stored still or moving image or various menu screens. However, embodiments of the invention are not limited thereto. Other constituents capable of displaying the above information may be used in place of the LCD 160.

The LCD 160, which is often referred to as a liquid crystal display device or a liquid crystal display, does not produce light itself, and thus uses a backlight. However, it is applicable to various products since it is operable at a low voltage, thus consuming low power, and is portable, compared to a cathode ray tube (CRT) display. LCDs in general may be a passive-matrix type or an active-matrix type. The passive-matrix LCDs include twisted nematic (TN) LCDs including a super-twisted nematic (STN) LCD, a double-layer STN (DSTN) LCD, and a color-STN (CSTN) LCD. Passive-matrix LCDs generally have a slower response time than active-matrix LCDs. In addition, it may be difficult to implement a high resolution with the passive-matrix LCDs. Meanwhile, the active-matrix type includes a thin-film transistor (TFT) LCD. The TFT LCD may be configured with a lower plate having thin-film transistors and pixel electrodes arranged thereon, an upper plate provided with a color filter for realization of colors and a common electrode, and liquid crystals filling the space between two glass substrates. Polarizing plates to linearly polarize visible light (for example, natural light) are attached to both sides of the two glass substrates. As the liquid crystals are disposed between the electrodes of the upper and lower plates, capacitors and auxiliary capacitors, where image information may be stored, are formed. When a TFT configuring a pixel is turned on by applying a voltage to the gate of the TFT, a voltage for an image is applied to the liquid crystals. When the TFT is turned off after image information is stored in the liquid crystals by applying the voltage for the image, the charges stored in the liquid crystal capacitor and the auxiliary capacitor may be allowed to display an image for a specific time. When the voltage is applied to the liquid crystals, the arrangement of the liquid crystals is changed. When light passes through the changed arrangement of the liquid crystals, light undergoes diffraction. A desired image may be obtained by transmitting the diffracted light through the polarizing plate.

The auxiliary IR light source 170 may emit auxiliary infrared light towards the subject. The auxiliary IR light source 170 is adapted to emit infrared light towards the subject when the quantity of light incident on the phase difference AF sensor module 140 is equal to or lower than a reference value. The auxiliary IR light source 170 may be placed at any position provided that it is capable of emitting light towards the subject for reflection (e.g., by the subject) back to the phase difference AF sensor module 140. For example, the auxiliary IR light source 170 may be disposed at a position in the electronic device 100 facing the subject.

Figure 3:
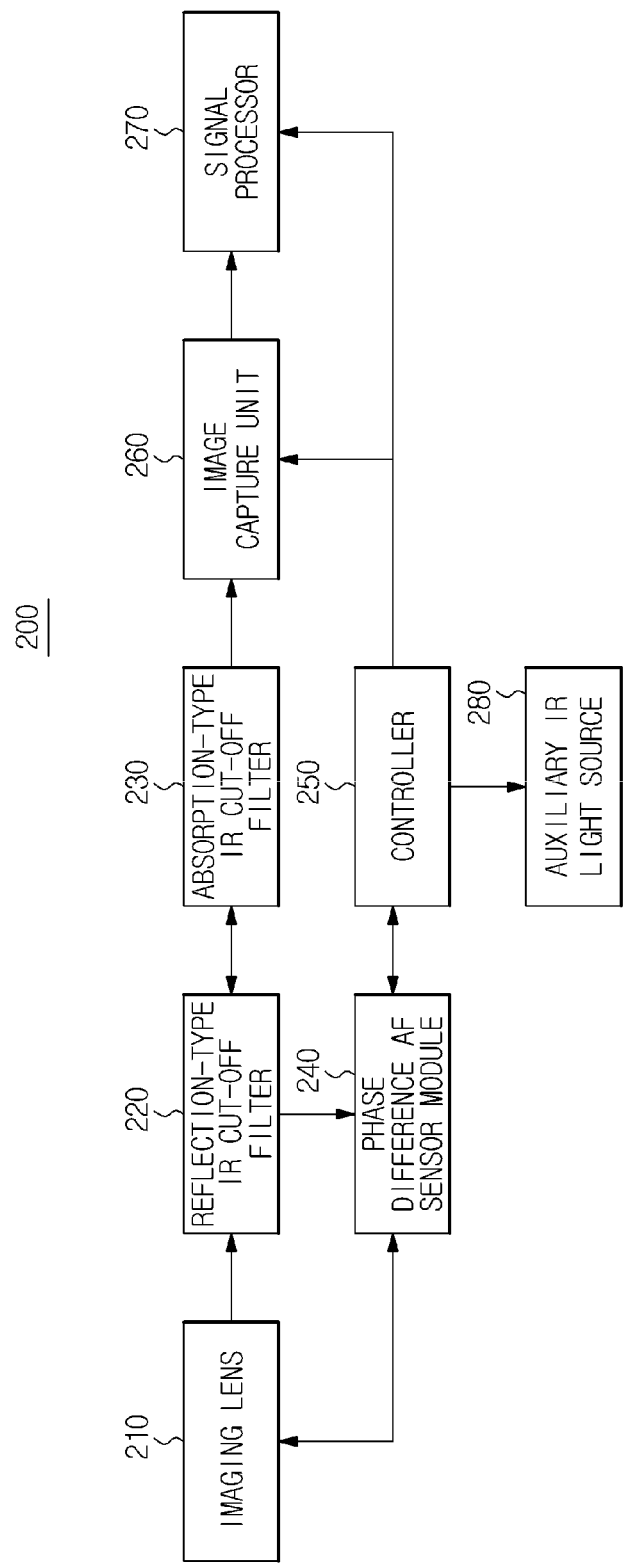
FIG. 3 is a block diagram illustrating a configuration of an autofocus system of an electronic device according to another embodiment.
Figure 4:
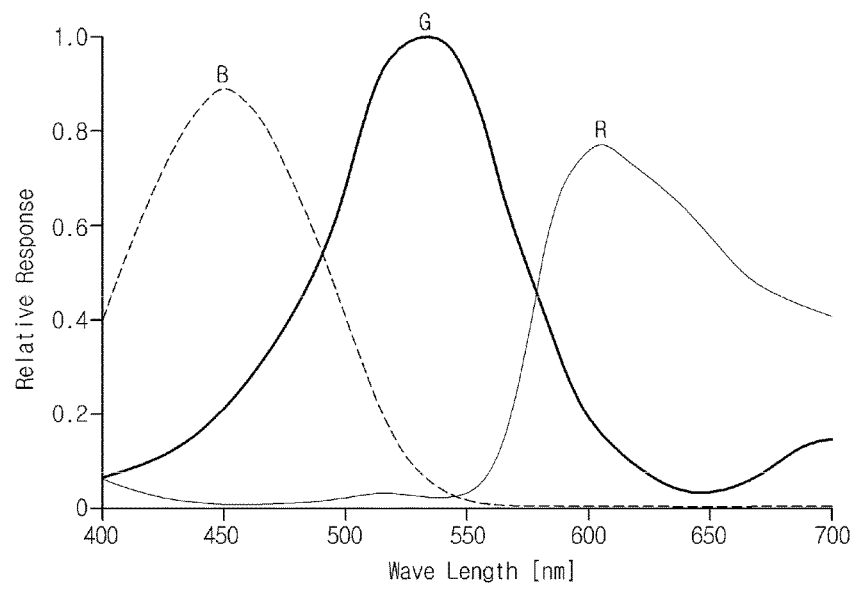
FIG. 4 is a chart illustrating spectral characteristics of an image sensor.

FIG. 3 is a block diagram illustrating a configuration of an autofocus system 200 of an electronic device, such as the electronic device 100, according to one embodiment, and FIG. 4 is a chart illustrating spectral characteristics of an image sensor. Hereinafter, a description will be given with reference to FIGS. 1 and 2 in addition to FIGS. 3 and 4.

As shown in FIG. 3, the autofocus system 200 may include an imaging lens 210, a reflection-type IR cut-off filter 220, an absorption-type IR cut-off filter 230, a phase difference AF sensor module 240, a controller 250, an image capture unit 260, a signal processor 270, and an auxiliary IR light source 280.

More specifically, the imaging lens 210 may receive incident light from outside the electronic device 100 and process an image. The imaging lens 210 may include at least one lens to focus incident light. The number of lenses may be varied, as desired or necessary.

One or more filters in the electronic device 100 (e.g., the reflection-type IR cut-off filter 220 and the absorption-type IR cut-off filter 230) are configured to filter incident light focused by the imaging lens 210 to allow only visible light in a predetermined wavelength band to pass therethrough. The IR cut-off filters 220 and 230 are adapted to filter light in an infrared wavelength band from the incident light. The reflection-type IR cut-off filter 220, which will be described below, may reflect, from the incident rays transmitted through the imaging lens 210, rays in the infrared wavelength band to the phase difference AF sensor module 240.

The reflection-type IR cut-off filter 220 may be disposed on the optical axis to reflect a first portion of incident light transmitted through the imaging lens 210 to the phase difference AF sensor module 240 and to allow a second portion of the incident light to be transmitted therethrough. As shown in FIG. 1, the reflection-type IR cut-off filter 120 may be disposed to have an inclination angle at which the incident light is reflected to the phase difference AF sensor module 140.

Analogously, the reflection-type IR cut-off filter 220 may reflect rays in the infrared wavelength band, from the incident rays, to the phase difference AF sensor module 240, and allow the other rays outside of the infrared wavelength band to be transmitted therethrough. For example, as shown in FIG. 2, the rays in the infrared wavelength band from the incident rays may be reflected to the phase difference AF sensor module 140 by the reflection-type IR cut-off filter 120, as phase difference AF data. The rays outside of the infrared wavelength band may be transmitted to the absorption-type IR cut-off filter 130 and the image sensor 150 through the reflection-type IR cut-off filter 120. Herein, the rays outside of the infrared wavelength band may be rays in the visible light band or in the short-wavelength band.

The absorption-type IR cut-off filter 230 may be disposed on the optical axis to perform filtering of rays transmitted through the reflection-type IR cut-off filter 220. Herein, the absorption-type IR cut-off filter 230 may provide additional filtering of the infrared wavelength band of light to be filtered, for example, rays transmitted through the reflection-type IR cut-off filter 220 due to the inclination angle of the reflection-type IR cut-off filter 220.

When the reflection-type IR cut-off filter 220 is configured to have an inclination angle with respect to the incident light, a transmissivity of the reflection-type IR cut-off filter 220 does not greatly change compared to the case in which the reflection-type IR cut-off filter 220 is positioned perpendicular to the incident light. However, in this case, a wavelength shift (i.e., difference in spectral characteristics) may occur based on the inclination angle as shown in FIG. 4, thereby degrading a shading effect. To prevent degradation of the shading effect, the incident light is filtered again by the absorption-type IR cut-off filter 230 to remove rays in the infrared wavelength band.

As shown in FIG. 1, the absorption-type IR cut-off filter 130 may be disposed between the image sensor 150 and the reflection-type IR cut-off filter 120 to face the image sensor 150 and to be parallel with the image sensor 150.

In addition, in the case that rays in the infrared wavelength band pass through the reflection-type IR cut-off filter 220, the absorption-type IR cut-off filter 230 may filter the rays in the infrared wavelength band that have not been filtered by the reflection-type IR cut-off filter 220.

The phase difference AF sensor module 240 may receive incident light reflected by the reflection-type IR cut-off filter 220.

The controller 250 may be connected to the phase difference AF sensor module 240 to perform auto-focusing for the subject based on the incident light reflected by the reflection-type IR cut-off filter 220. Herein, the auto-focusing operation is an operation of automatically focusing the electronic device 100 on the subject to capture an image thereof when image composition of the subject is set and a shutter-release button (not shown) is operated. Autofocus systems for electronic devices may be broadly classified into active systems and passive systems. The active system measures the distance to the subject using ultrasound or infrared light emitted from the electronic device, while the passive system focuses on the subject using light naturally reflected from the subject. Auto-focusing may generally be successfully performed under the conditions of a high contrast and a high signal-to-noise ratio (SNR). In the case that the contrast is low or the SNR is low, auto-focusing may not be properly performed at low brightness. The electronic device 100 according to the illustrated embodiment reflects light toward the phase difference AF sensor module 240 through the reflection-type IR cut-off filter 220 and utilizes the reflected light as the phase difference AF data, and therefore may improve reliability of a resulting captured image even at low brightness. In addition, the controller 250 may control movement of the imaging lens 210 based on a focal length detected based on a result of performing the auto-focusing.

The image capture unit 260 may convert the incident light having passed through the absorption-type IR cut-off filter 230 into an electrical signal. Herein, the image capture unit 260 may be an image sensor. The image sensor in one example is an image detection device, such as a CCD or CMOS device. In one example of a CCD, more than one hundred thousand detection elements may be provided on a coin size chip, and charge packets representing an image for which the focal point is formed on the surface of the chip are accumulated in each detection element. These charge packets are output at high speed and subjected to a conversion process by a charge transfer mechanism to display the image. The detection elements of the CCD are a detection array, whose region is divided for accumulation and output of charge packets.

The signal processor 270 may perform signal processing operations, for example, gain adjustment, noise elimination, gamma correction, separation of a luminance signal, or image signal compression, for an electrical signal output by the image capture unit 260.

The auxiliary IR light source 280 may emit auxiliary infrared light towards the subject. In the case that a quantity of incident light transmitted to the phase difference AF sensor module 240 is equal to or less than a reference value, the controller 250 may control the auxiliary IR light source 280 to emit auxiliary infrared light. The auxiliary IR light source 280 may be provided at a position in the electronic device 100 which allows the auxiliary IR light source 280 to emit infrared light towards the subject for reflection (e.g., by the subject) back to the phase difference AF sensor module 240. The reference value is a reference quantity of light that is used for the phase difference AF sensor module 240 to perform auto-focusing. The reference value may be set as desired by the operator or manufacturer of the electronic device 100.

Figure 5:
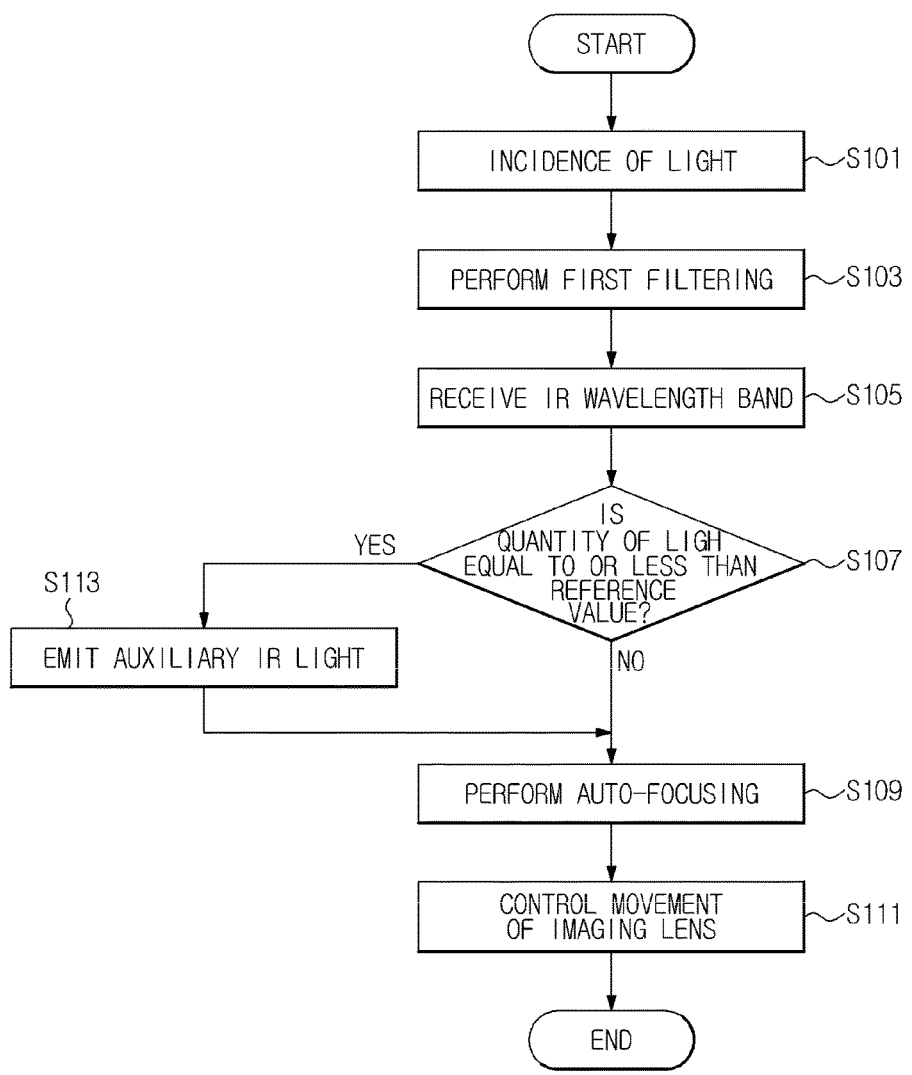
FIG. 5 is a flowchart illustrating a method for auto-focusing of an electronic device according to an embodiment.

FIG. 5 is a flowchart illustrating one example of a method for auto-focusing of an electronic device by the autofocus system 200, according to an embodiment. Hereinafter, a description will be given of FIG. 5 with reference to FIGS. 2 and 3.

When light rays are incident (S101) on the reflection-type IR cut-off filter 220 of the autofocus system 200 through the imaging lens 210, the reflection-type IR cut-off filter 220 may perform a first filtering (S103), thereby allowing incident rays outside of the infrared wavelength band to be transmitted therethrough and reflecting the incident rays in the infrared wavelength band to the phase difference AF sensor module 240.

For example, as shown in FIG. 2, the incident rays in the infrared wavelength band may be reflected by the reflection-type IR cut-off filter 120 (or 220) to the phase difference AF sensor module 140 (or 240) as the phase difference AF data, and the incident rays outside of the infrared wavelength band may be transmitted to the absorption-type IR cut-off filter 130 (or 230) and the image sensor 150 (or image capture unit 260). Herein, the incident rays outside of the infrared wavelength band may be incident rays in the visible light band or in the short-wavelength band.

The phase difference AF sensor module 240 may receive (S105) the incident rays in the infrared wavelength band reflected by the reflection-type IR cut-off filter 220 according to the first filtering.

Thereafter, the controller 250 of the autofocus system 200 may determine (S107) if the quantity of light received by the phase difference AF sensor module 240 in operation S105 is equal to or less than a reference value.

In the case that the quantity of the rays is determined to be not equal to or less than the reference value (NO in operation S107), the controller 250 may perform auto-focusing (S109) on the subject based on the incident light, and may control (S111) movement of the imaging lens 210 according to the result of auto-focusing.

Herein, the auto-focusing operation is an operation of automatically focusing the electronic device 100 on the subject to capture an image thereof when composition for the subject is set and the shutter-release button is operated. Autofocus systems for electronic devices may be broadly classified into active systems and passive systems. The active system measures the distance to the subject using ultrasound or infrared light emitted from the electronic device, while the passive system focuses on the subject using light naturally reflected from the subject. Auto-focusing may generally be successfully performed under the conditions of a high contrast and a high signal-to-noise ratio (SNR). In the case that the contrast is low or the SNR is low, auto-focusing may not be properly performed at low brightness. The electronic device 100 according to the illustrated embodiment reflects light toward the phase difference AF sensor module 240 through the reflection-type IR cut-off filter 220 and utilizes the reflected light as the phase difference AF data, and therefore may improve reliability of a resulting captured image even at low brightness.

In the case that the quantity of the rays is determined to be equal to or less than the reference value (YES in operation S107), the controller 250 may control the auxiliary IR light source 280 to emit auxiliary IR light (S113).

For DSLR cameras, due to the structure of their mirror, the mirror needs to be complicatedly lifted or lowered to capture an image. In addition, the DSLR camera may not secure reliability of the captured image, and further has an undesirably large body. Moreover, in the case of an optical viewfinder, a complex technique may need to be applied to the viewfinder since the viewfinder may be implemented by a combination of a total reflection mirror and a pentaprism. Moreover, since the pentaprism is relatively expensive, application thereof may be limited only to high-end cameras.

In addition, the DSLT camera (not shown) does not require fast and precise control of vertical movement of the mirror, compared with the DSLR camera, and thus may provide a good continuous shooting speed, and may allow operation of the phase difference AF even in a live view mode. Accordingly, the DSLT camera may perform auto-focusing and capture a stabilized image in any situation. However, the DSLT camera employs a fixed translucent mirror, and accordingly the image quality may be degraded due to loss of light quantity.

In the case of a compact camera (not shown), the image sensor applied thereto may be limited to a small size. Accordingly, the quality of an image obtained therewith may be lower than in the DSLR camera. In addition, as image capture is performed through an electronic viewfinder, a large amount of power may be consumed. In addition, since it does not have a mirror, it may be difficult to realize an optical viewfinder.

In contrast, the electronic device 100 according to the illustrated embodiment does not require fast and precise control of movement of a mirror, and therefore, a continuous shooting speed may be higher. In addition, since the electronic device 100 is capable of operating the phase difference AF sensor module 140 even in the live view mode, it may obtain sufficient AF phase difference data even in a situation with low incident light by turning on the auxiliary IR light source 170. Accordingly, it may perform auto-focusing and capture a stabilized image in many situations, without degrading image quality.

As is apparent from the above description, according to one aspect of an autofocus system for an electronic device and an electronic device using the same, light in the infrared wavelength band is reflected toward a phase difference AF sensor by a reflection-type IR cut-off filter while light outside of the infrared wavelength band is transmitted through the reflection-type IR cut-off filter. Accordingly, the continuous shooting speed may be improved. In addition, auto-focusing may be performed even in the live view mode by operating a phase difference AF sensor.

Although a few embodiments of the invention have been shown and described, it would be appreciated by those skilled in the art that changes may be made in these embodiments without departing from the principles and spirit of the invention, the scope of which is defined in the claims and their equivalents.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention. No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic device comprising:
   an image sensor;
   a phase difference autofocus (AF) sensor module;
   a reflection-type infrared (IR) cut-off filter disposed on an optical axis to reflect a first portion of light incident thereon through an imaging lens to the phase difference AF sensor module and to allow a second portion of the light to be transmitted therethrough;
   an absorption-type IR cut-off filter disposed between the image sensor and the reflection-type IR cut-off filter on the optical axis and configured to filter the second portion of the light transmitted through the reflection-type IR cut-off filter and transmit the light, the second portion of which is filtered, to the image sensor; and
   an auxiliary infrared light source disposed at a position in the electronic device facing the phase difference AF sensor module, and configured to emit auxiliary infrared light when a quantity of light incident on the phase difference AF sensor module is equal to or lower than a reference value,
   wherein the phase difference AF sensor module performs auto-focusing on a subject using the first portion of the light reflected from the reflection-type IR cut-off filter,
   wherein the reflection-type IR cut-off filter is disposed to have an inclination angle that allows the first portion of the light to be reflected to the phase difference AF sensor module, and
   wherein the absorption-type IR cut-off filter filters an infrared wavelength band of light of the second portion of the light that has not been filtered by the reflection-type IR cut-off filter due to the inclination angle of the reflection-type IR cut-off filter.

2. The electronic device according to claim 1, wherein the absorption-type IR cut-off filter is disposed between the image sensor and the reflection-type IR cut-off filter to face the image sensor and to be parallel with the image sensor.

3. An autofocus system for an electronic device comprising:
   a phase difference autofocus (AF) sensor module;
   a controller connected to the phase difference AF sensor module;
   a reflection-type infrared (IR) cut-off filter disposed on an optical axis to reflect a first portion of light incident thereon through an imaging lens to the phase difference AF sensor module and to allow a second portion of the light to be transmitted therethrough;
   an absorption-type IR cut-off filter disposed on the optical axis and configured to filter the second portion of the light transmitted through the reflection-type IR cut-off filter and transmit the light, the second portion of which is filtered, to the image sensor; and an auxiliary infrared light source disposed at a position in the electronic device facing the phase difference AF sensor module, and configured to emit auxiliary infrared light;

wherein the phase difference AF sensor module receives the first portion of light reflected from the reflection-type IR cut-off filter;

wherein the controller performs auto-focusing on a subject using the first portion of light reflected from the reflection-type IR cut-off filter, wherein the reflection-type IR cut-off filter is disposed to have an inclination angle that allows the first portion of the light to be reflected to the phase difference AF sensor module, wherein the absorption-type IR cut-off filter filters an infrared wavelength band of light of the second portion of the light that has not been filtered by the reflection-type IR cut-off filter due to the inclination angle of the reflection-type IR cut-off filter; and wherein, if a quantity of the first portion of light received by the phase difference AF sensor module is equal to or less than a reference value, the controller controls the auxiliary infrared light source to emit the auxiliary infrared light.

4. The autofocus system according to claim 3, wherein the first portion of the light includes light with a wavelength in an infrared wavelength band and the second portion of the light includes light with a wavelength outside of the infrared wavelength band.

5. The autofocus system according to claim 4, wherein, when a third portion of the light in the infrared wavelength band is transmitted through the reflection-type IR cut-off filter, the absorption-type IR cut-off filter filters the third portion of the light in the infrared wavelength band transmitted through the reflection-type IR cut-off filter.

6. The autofocus system according to claim 3, further comprising an image capture unit to convert the light transmitted through the absorption-type IR cut-off filter into an electrical signal.

7. The autofocus system according to claim 6, wherein the image capture unit is an image sensor, wherein the absorption-type IR cut-off filter is disposed between the image sensor and the reflection-type IR cut-off filter to face the image sensor and to be parallel with the image sensor.

8. The autofocus system according to claim 3, wherein the controller controls movement of the imaging lens based on a focal length detected based on a result of performing the auto-focusing.

* * * * *